Aug. 17, 1965 R. NEUSCHOTZ 3,200,691
THREADED ELEMENTS WITH SELF-TAPPING PEAKS AND RECESSES
Filed Aug. 6, 1962 3 Sheets-Sheet 1

ROBERT NEUSCHOTZ
INVENTOR.

BY William P. Green
ATTORNEY

Aug. 17, 1965  R. NEUSCHOTZ  3,200,691
THREADED ELEMENTS WITH SELF-TAPPING PEAKS AND RECESSES
Filed Aug. 6, 1962  3 Sheets-Sheet 2
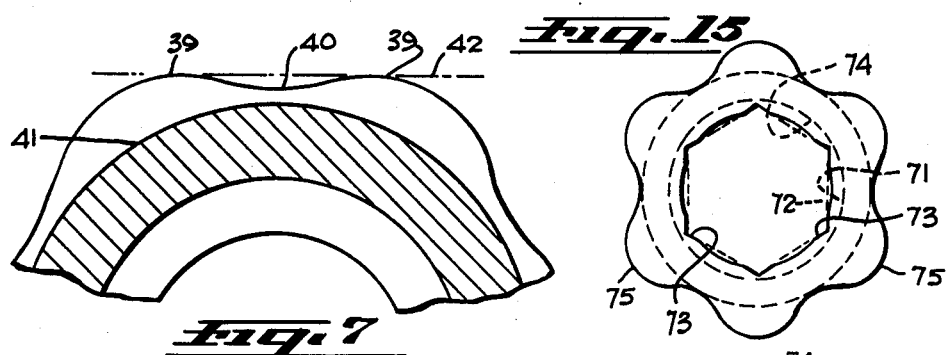
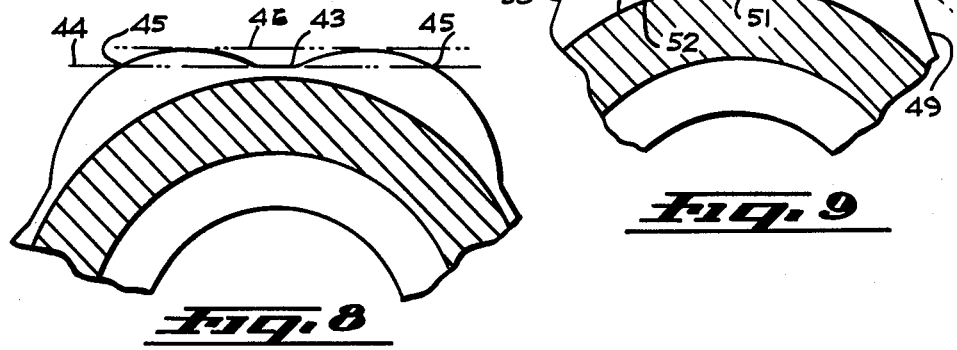
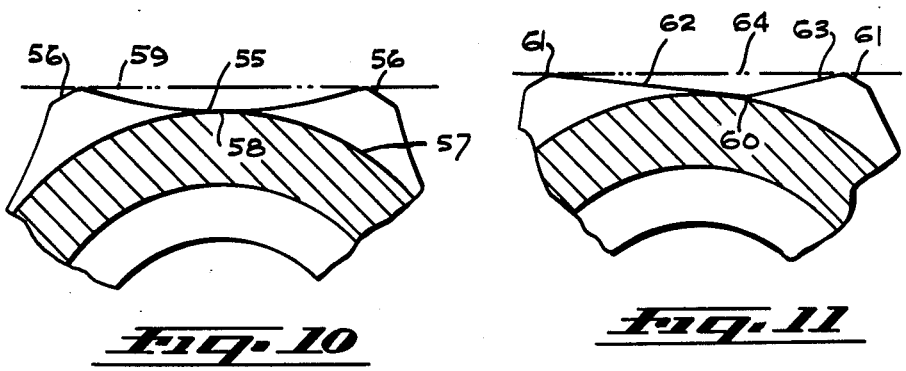
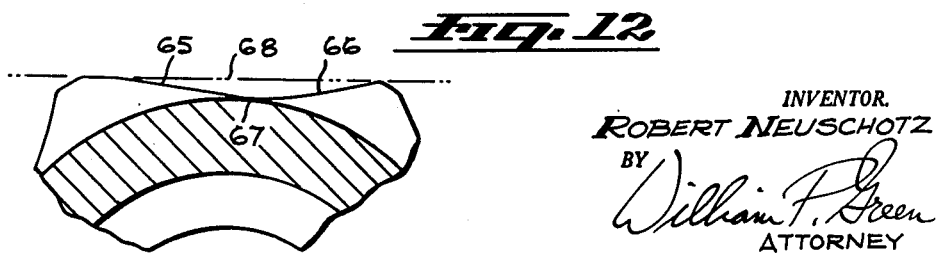
INVENTOR.
ROBERT NEUSCHOTZ
BY William P. Green
ATTORNEY Aug. 17, 1965
R. NEUSCHOTZ
3,200,691
THREADED ELEMENTS WITH SELF-TAPPING PEAKS AND RECESSES
Filed Aug. 6, 1962
3 Sheets-Sheet 3
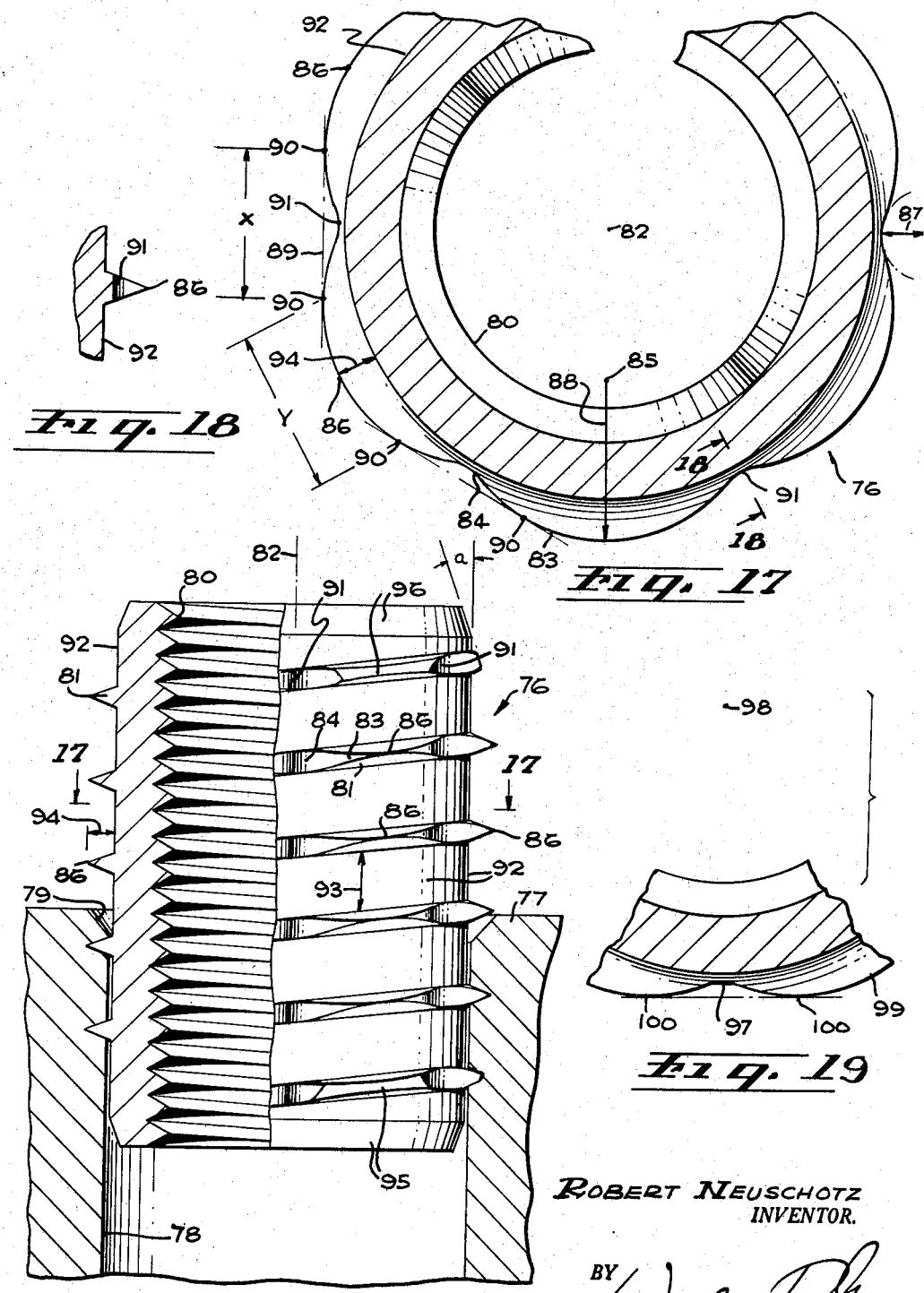
Robert Neuschotz
INVENTOR.
BY
ATTORNEY United States Patent Office 3,200,691
Patented Aug. 17, 1965

3,200,691
THREADED ELEMENTS WITH SELF-TAPPING
PEAKS AND RECESSES
Robert Neuschotz, 1162 Angelo Drive,
Beverly Hills, Calif.
Filed Aug. 6, 1962, Ser. No. 214,939
8 Claims. (Cl. 85—47)

The present application is a continuation-in-part of my copending application Serial Number 100,687, filed April 4, 1961, on "Self-Tapping Element Having Recessed Sides" and which is now abandoned.

This invention relates to an improved type of self-tapping and self-locking threaded element, preferably taking the form of an internally and externally threaded insert to be connected into an opening in a carrier part. Elements embodying the invention may be formed by the method disclosed and claimed in my copending application Serial Number 25,169, filed April 11, 1960, and now Patent No. 3,159,842, on "Method of Forming a Self-Tapping Threaded Element."

The self-tapping action of the present insert is attained by forming the insert body to have external threads presenting radially outer surfaces of a unique non-circular cross-sectional configuration, such that these outer surfaces form a series of circularly spaced radially outwardly projecting peaks at different locations about the axis of the device. Preferably, in accordance with the teachings of the above identified copending application Serial Number 25,169, the element is formed by externally threading a length of non-circular bar stock, whose cross-sectional shape is such as to give to the ultimate threaded element the desired peaked configuration.

Structurally, the present inserts are characterized by the formation of their outer non-circular surfaces in a manner providing, between successive outwardly projecting peaks, minimum radius portions which are recessed inwardly beyond a plane which is drawn to just touch the two adjacent peaks. In advancing toward and beyond these recessed inter-peak areas, the outer surfaces of the threads progressively truncate the external threads of the device in a manner such that the threads first progressively decrease in radial thickness, and then increase in radial thickness toward the next peak. As the insert is screwed into an initially unthreaded bore, the peak areas tap threads in the wall of that unthreaded bore, preferably by a thread rolling rather than a thread cutting operation. The provision of the recessed areas between the peaks allows for deformation of the material of the bore wall radially inwardly into those recessed areas, by virtue of the thread rolling operation. At the same time, however, the recesses are so formed as to be sufficiently shallow to avoid interference with the intended thread rolling type of operation, since the provision of excessively deep recesses would result in the formation of sharp cutting edges at the leading sides of the peaks, and therefore cause a cutting or shearing action rather than a rolling operation. The recesses are desirably sufficiently shallow to assure that the external threads of the device, though truncated by the non-circular outer surface of the body, will nevertheless continue through the major portion of the circular distance between the outermost portions of two successive peaks. For best results, the recesses do not advance radially inwardly substantially beyond the minor diameter of the external threads.

The above and other features and objects of the present invention will be better understood from the following detailed description of the typical embodiments illustrated in the accompanying drawings in which:

FIGS. 7 through 12 are views similar to FIG. 5, but showing six additional forms of the invention;

FIG. 15 is a view similar to FIG. 4, but showing still another form of the invention; and FIG. 16 is a view similar to FIG. 1 of another form of the invention;

FIG. 17 is an enlarged section taken on line 17—17 of FIG. 16;

FIG. 18 is a section taken on line 18—18 of FIG. 17; and

FIG. 19 is a view similar to FIG. 17 but showing another variational form of the invention.

Figure 1:
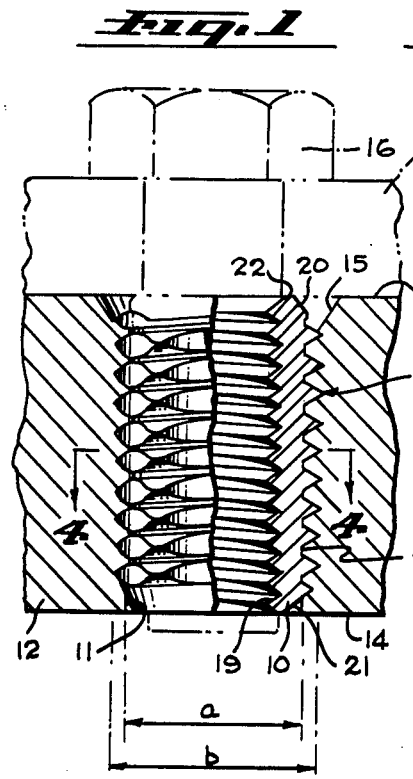
FIG. 1 is a partially sectional view representing an insert embodying the present invention, as the insert appears when installed in an opening in a carrier part.

In FIG. 1, there is shown at 10 a self-tapping and self-locking threaded insert constructed in accordance with the invention, and illustrated in a position of connection into an initially unthreaded bore 11 in a carrier part 12. This part 12 may typically be a sheet of plastic material, soft aluminum, or in some instances a harder material; and the bore 11 may be considered as initially having a straight cylindrical wall extending substantially the entire distance between upper surface 13 and under surface 14 of part 12. At the upper extremity of this bore 11, there may be formed a short countersink 15 for assisting in directing the insert into the carrier part. As element 10 is screwed downwardly to the FIG. 1 position, the insert forms threads in the wall of bore 11, to thereby retain the insert in the carrier part. Subsequently, a coacting bolt or stud represented at 16 may be screwed into insert 10, to secure a part 17 to part 12.

The insert takes the form of an essentially tubular body, having external threads 18 for engaging carrier part 12, and having internal threads 19 into which bolt 16 is connectable. The internal threads may be of uniform minor diameter and uniform major diameter throughout their entire length. Similarly, external threads 18 may have a minor diameter $a$ and a major diameter $b$, both of which are uniform along the entire length of the insert except insofar as the threads are truncated by the later-to-be-described external cross-sectional shape of body 10, and by the provision of chamfers 20 and 21 at the opposite ends of the insert. The chamfer 21 at the axially inner end of the insert may extend entirely inwardly to the internal threads 19, while the smaller chamfer 20 at the axially outer end of the insert may terminate at a point leaving an annular surface 22 facing directly axially for engagement with an installing tool to be used in screwing the insert into position in part 12. The threads 18 as typically illustrated in FIG. 1 are represented as having a modified minor or root diameter, leaving axially extending cylindrical minor diameter surfaces 23 between successive turns of the external threads. These various surfaces 23 are of course in reality continuations of one another, and form together a single helically advancing cylindrical minor diameter surface. It is preferred that each axially extending surface 23 between two successive thread turns have a very substantial axial extent, to provide ample space for reception of material of the carrier part 12 which is deformed by threads 18 in their tapping action. More particularly, it is desirable that each surface 23 have an axial extent, between two thread turns, which is at least about one-half as great as the maximum radial thickness of the threads 18 (between minor diameter surface 23 and one of the later-to-be-discussed thread peak locations 28).

Figure 5:
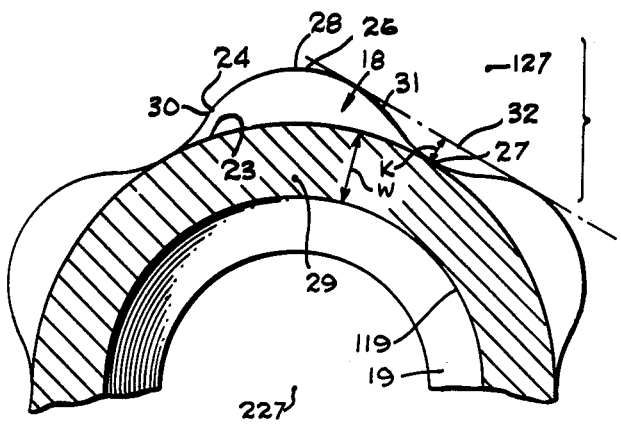
FIG. 5 is a further enlarged fragmentary cross-sectional representation of the insert of FIG. 1.

In FIG. 5, the external threads 18 extend radially between the minor diameter surfaces or portions 23 of the threads, and a non-circular radially waving outer surface 24 formed on the individual threads. To provide this outer surface on the threads, the insert 10 is formed from a piece of bar stock 25 (FIGS. 2 and 3), having the cross-sectional configuration represented in FIG. 3. This cross-sectional configuration is desirably uniform along the entire length of bar 25, and is defined by a radially waving outer surface 24a, portions of which form the outer thread surfaces 24 of the ultimate insert. Outer surface 24a is desirably shaped to form five, six or seven peaks 26, preferably six such peaks, spaced uniformly about the main axis 227 of insert 10, and projecting radially outwardly beyond the intermediate minimum radius portions 27 of the outer surfaces 24. A series of successive inserts 10 are formed from a single length of the non-circular bar stock 25, by externally threading and chamfering successive portions of the bar stock, cutting those sections off after such external threading to proper lengths to form the individual inserts (as by cutting along the line represented at 28 in FIG. 2), and internally threading the insert either before or after such removal from the bar stock.

When the external threads are formed on the stock, the non-circular cross-section of the bar stock automatically causes the external threads to be truncated in accordance with the waving configuration of the outer surface 24a of the stock. More particularly, as brought out clearly in FIG. 5, the external threads have portions at the centers 28 of peaks 26 which are of maximum radial thickness, and the surface 24 progressively advances radially inwardly from a peak location 28 to an intermediate point 27 at which the radial distance of surface 24 from axis 227 is a minimum, and the radial thickness of external threads 18 is a minimum. Beyond point 27, the surface 24 progressively increases in radius to the center 28 of the next successive peak 26.

In the form of the invention shown in FIG. 5, the peaks 26 are of convex cross-sectional curvature, desirably being arcuate and each being centered about an individual axis such as that shown at 29 in FIG. 5. The axes 29 are of course disposed parallel to main axis 227 of the insert. This arcuate curvature of a peak may extend between the points represented at 30 and 31 in the figure. The minimum radius portions between successive peaks, at and near the points 27, are of arcuate concave curvature in the FIG. 5 arrangement, and may have a radius of curvature (about individual axes 127 parallel to axes 29) equal to, or approximately equal to, the radius of curvature of the peak surfaces about axes 29.

At 32 in FIG. 5, I have represented a plane which is drawn to just touch, and is tangential to, two successive peaks 26 of the insert. Of particular importance to optimum functioning of the present device in the types of carrier parts for which it is especially designed is the formation of the inter-peak minimum radius portions 27 of the insert to be recessed radially inwardly beyond this plane designated 32. However, it is also highly important that the recessing at 27 be sufficiently shallow to avoid the development of sharp cutting edges at the opposite sides of the peaks. For this reason, it is presently thought preferable that the minimum radius portions 27 be spaced from axis 227 at least about as far as is the minor diameter 23 of the external threads. Stated differently, portions 27 are not, in the optimum arrangement, recessed inwardly substantially beyond the minor diameter of the external threads. In FIG. 5, an arrangement is illustrated in which the recess at 27 is tangential to the minor diameter of the threads.

In FIG. 5, the maximum depth of the recesses at 27, radially of axis 227, and between each point 27 and its corresponding plane 32, is designated by the letter K. The radial wall thickness of the insert, between the major diameter portions 119 of internal threads 19 and minor diameter portions 23 of external threads 18, is designated W. With reference to the relationship between these two dimensions, it is preferred that the maximum depth K of the inter-peak recesses be not greater than wall thickness dimension W.

Because of the discussed method of formation of external threads 18, it will be apparent that the external threads are of uniform section (transversely of their length) from one peak to the next, except insofar as surface 24 truncates the threads, and except insofar as the end threads are chamfered at 20 and 21. Also, it will be apparent that, by virtue of such truncation of the threads, surfaces 24 widen progressively in advancing from one peak 28 to an inter-peak location 27, and then narrow progressively to the next peak (see FIG. 1).

To now describe the manner of use of the device of FIGS. 1 through 5, it is noted that as insert 10 is screwed into initially unthreaded bore 11, the external threads 18 act to roll mating threads in the inner surface of part 12, as illustrated in FIG. 1. As each of the rounded peaks 26 is forced through the material of part 12, it serves to cam the material of that part outwardly in a manner forming the desired internal threads in part 12. The gradual rise formed by the rounded surface of part 26 assures a thread rolling rather than a sharp thread cutting action, to thus attain the advantages inherent in thread rolling operations. The extension of peaks 26 outwardly into the material of part 12 also attains a self-locking action, retaining the insert against accidental unscrewing movement from part 12. As will be apparent, some of the material of part 12 inherently moves behind the individual peaks 26, after a peak has passed a particular portion of the carrier part body, to thus block unscrewing movement of the insert. Also, the provision of inwardly recessed areas 27 between the peaks, and extended minor diameter surfaces 23 between successive thread turns, allows for reception of some of the material of part 12 at these inter-peak and interthread locations, in a manner maximizing the self-locking action, and increasing the holding effectiveness of threads 18. This increased holding effectiveness is particularly desirable in softer materials, such as plastics and the like, in which there may be a decided tendency for an insert of conventional construction to tear out of the carrier part. It is further found that the convex cross-sectional configuration of the peaks adds greatly to the force with which the insert is retained against removal from part 12.

Figure 6:
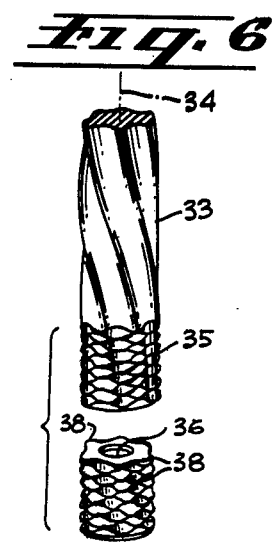
FIG. 6 is a view similar to FIG. 2, but representing a variational form of the invention.

FIG. 6 represents the method of formation of a variational type of insert, which may be considered identical with that of FIGS. 1 through 5 except that the bar stock 33 is given a permanent twist about its longitudinal axis 34 before being externally threaded at 35, internally threaded at 36, and cut off to form the separate inserts 37. The cross-section of the bar stock may be the same as that shown in FIG. 3, and the ultimate cross-section of the individual turns of the external threads may be the same as are shown in FIG. 5. The purpose of such twisting of the bar stock is to cause corresponding peaks 38 of successive turns of the external threads to be circularly offset from one another, to thereby further increase the pull-out strength of the threaded connection between the threaded insert and the outer carrier part.

FIGS. 7 through 12 are views similar to FIG. 5, but showing several possible variational forms of the invention, which differ from the device of FIGS. 1 through 5 only with regard to the particular cross-sectional configuration of the bar stock from which the device is made, and the resulting cross-sectional shapes of the peaks and recessed inter-peak areas formed by the outer non-circular surfaces of the threads. For example, in FIG. 7, the peaks 39 have essentially the same convex arcuate cross-section as in FIG. 5, but the intermediate minimum radius portions 40 of the outer surfaces on the threads are recessed inwardly more shallowly, and not as far as the minor diameter surfaces 41 of the threads. The portions 40 are, however, recessed inwardly a substantial distance beyond plane 42 which corresponds to plane 32 of FIG. 5, to attain the same advantages resulting from the recessed configuration in FIG. 5. FIG. 8 shows a form of the invention which is the same as that of FIG. 7, except that the minimum radius portions 43 are planar, rather than being curved continuously, with surfaces 43 typically lying in a plane 44 extending between the maximum radius points 45 of the peaks. This plane 44, and surfaces 43 are parallel to plane 46, which corresponds to the plane 32 of FIG. 5. As in the other forms of the invention, surface 43 is recessed inwardly beyond plane 46.

FIG. 9 shows an arrangement in which the peaks 47 are not curved, but instead have flat outer surfaces 48, and are defined at their opposite sides by planar surfaces 49 and 50 extending inwardly to the minimum radius point 51. These points 51 may typically fall substantially on the minor diameter 52 of the external threads of the insert. As in the other forms of the invention, the major diameter 53 of the external threads should preferably coincide with the outermost extremities of the peaks. The line 54 in FIG. 9 represents the plane which just touches the two peaks, and beyond which point 51 is recessed radially inwardly.

FIG. 10 shows an insert which may be substantially the same as that of FIG. 9, except that the outer surfaces 55 of the threads curve progressively and continuously between successive peaks 56, with surfaces 55 typically being tangential to the minor diameter 57 of the external threads at 58. The plane corresponding to plane 32 of FIG. 5 is designated 59 in FIG. 10.

FIG. 11 is the same as FIG. 9, except that the minor diameter portion 60 between peaks 61 is offset circularly to be closer to one of the peaks than the next. It is assumed that the device of FIG. 11 is turned in a clockwise direction during installation into the carrier part, so that the more gradually inclined planar surface 62 is the leading side of a peak, while the more abruptly inclined surface 63 is the trailing side. The gradual inclination of the surface 62 facilitates the thread rolling action on the material of the carrier part, while the abruptness of surface 63 increases the effectiveness with which the peaks bite into the material of carrier part 12 when the insert is turned in an unscrewing direction, to thereby increase the force which resists such unscrewing rotation. The plane relative to which point 60 is recessed radially inwardly is represented at 64 in FIG. 11. FIG. 12 is the same as FIG. 11, except that the surfaces 65 and 66 corresponding to surfaces 62 and 63 of FIG. 11 have been curved slightly, and merge in a smooth curve at the minimum radius location 67. The reference plane corresponding to plane 32 of FIG. 5 is designated 68 in FIG. 12.

Figure 13:
FIGS. 13 and 14 represent two different peak configurations which may be employed in the inserts of FIGS. 9 through 12.
Figure 14:

Any of the peaks shown in FIGS. 9 through 12 may be slightly rounded at its corners, as represented at 69 in FIG. 13, or may be continuously rounded in the manner represented at 70 in FIG. 14.

FIG. 15 shows another form of the invention, which may be the same as that of FIGS. 1 through 5 except for alteration of the internal threads 71 to enable them to be engaged by a tool which is used in screwing the insert into a carrier part. More specifically, the internal bore within the insert is broached, before the insert is internally threaded, by a broaching tool of the regular polygonal cross-sectional configuration represented by broken lines 72. The corners of this tool form a series of circularly spaced corner recesses 73 extending radially outwardly into threads 71, but desirably not extending outwardly beyond the major diameter 74 of those threads. There are preferably the same number of internal recesses 73 as external peaks 75, with the maximum diameter portions of the individual recesses being directly radially opposite the maximum diameter portions of the individual peaks. The recesses 73 continue axially through at least several turns of the internal threads, and may if desired continue through the entire axial extent of the insert.

In installing the device of FIG. 15, there is inserted axially into the device a driving tool having the regular polygonal (preferably hexagonal) external cross-section represented by broken lines 72. The corners of this tool thus fit within recesses 73, so that the insert may be screwed into a carrier part by turning the tool.

FIGS. 16 through 18 illustrate in enlarged and detailed form another variation of the invention which, after extensive development and testing, appears at present to be in most respects an optimum embodiment of the invention. FIG. 16 shows this form of insert 76 during installation within a carrier part 77 containing an initially unthreaded cylindrical bore 78 which has at its axially outer end a counter sink 79. The internal threads of insert 76 are represented at 80, and the external threads are represented at 81, both threads of course being centered about a central axis 82 of the tubular insert.

Figure 2:
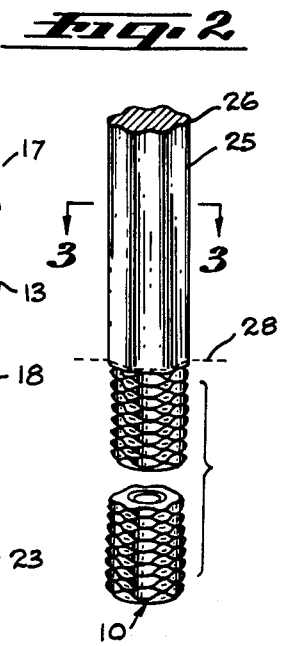
FIG. 2 is a view representing the manner in which the insert of FIG. 1 may be manufactured.
Figure 3:
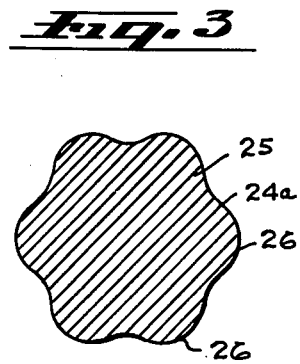
FIG. 3 is an enlarged transverse section taken on line 3—3 of FIG. 2.
Figure 4:
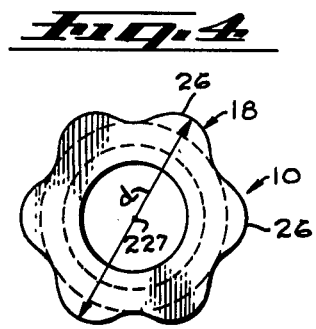
FIG. 4 is a transverse section taken on line 4—4 of FIG. 1.

The insert of FIGS. 16, 17 and 18 is formed from an initially non-circular metal rod, by essentially the same method illustrated in FIG. 2 and discussed in connection with that figure. However, the cross-section of the rod or stock for the insert of FIGS. 16 through 18 is somewhat different than in FIG. 2, and in particular corresponds to the outer periphery of the ultimate insert as illustrated in FIG. 17. More specifically, it is noted that in FIG. 17, the six rounded peaks 83 are of somewhat greater circular extent than in the cross-section of FIG. 5, while the inter-peak recesses 84 are essentially of smaller circular extent than in FIG. 5, and relative to the extent of the peaks. To attain this result, the peaks 83 are centered about axes 85, and have a radius of curvature which is preferably at least about as great as 40 percent, and desirably approximately 50 percent, of the radial distance from main axis 82 to the outermost tips 86 of the peaks. The inner portions of recesses 84 may be curved at a radius of curvature 87 which is considerably smaller than the radius 88 of peak surfaces 83, radius 88 preferably being at least twice as great as radius 87.

The plane which just touches two adjacent peaks in FIG. 17 is represented at 89. As in the other forms of the invention, the surface 84 is recessed inwardly beyond plane 89 a substantial distance. Each of the planes 89 touches two adjacent peaks at two points of tangency 90. In FIG. 17, the distance X between these two points 90, across one of the recesses 84, is desirably not substantially greater than the distance Y across one of the peaks, between two successive points of tangency at opposite sides of the peak. This of course results from the fact that the radius of curvature 88 of the peaks is greater than the radius of curvature of recessed areas 84. Because the peaks are in effect of increased circular extent, as compared with the FIG. 5 arrangement, the peaks in FIG. 17 have a more effective self-tapping action and self-locking action, to maximize the results intended to be attained by the insert. It is also noted that, in FIG. 17, the minimum radius portions 91 of recesses 84 do not advance radially inwardly as far as cylindrical minor diameter surface or surfaces 92 of the external threads (see FIG. 18), so that even at the recessed locations 91 the threads project outwardly a short distance beyond minor diameter surfaces 92.

The external thread 81 formed on insert 76 is, in FIGS. 16 through 18, considerably sharper or thinner than a conventional 60 degree included angle thread. That is, the included angle defined by the two opposed sides of thread 81 is substantially less than 60 degrees, preferably less than 50 degrees, and for best results is approximately 40 degrees. As a result, the thread is capable of biting into and deforming the material of carrier part 77 very effectively. Further, as will be apparent from FIG. 16, the thread 81 is of relatively great pitch as compared with the axial thickness of a single turn of the thread, so that the axial extent 93 of axially extending minor diameter surface 92 between two successive turns is very great, and is for best results at least about as great as the maximum radial thickness 94 of external thread 81 at the maximum diameter peak locations. The extended minor diameter surface 92 is desirable in order to assure ample room between two successive turns of the thread for reception of material of carrier part 77 which is deformed during the thread tapping action. In this connection, it is noted that the diameter of surface 92 on the insert is somewhat less than the initial diameter of unthreaded bore 78 in part 77, to allow for inward displacement of the inter-thread portions of bore 78. Even after the installation of the insert, there is usually still a substantial gap between surface 92 and the opposed portions of carrier part 77, though in some soft materials such as soft plastics the gap may not be present.

The axially inner and outer ends of insert 76 are externally chamfered at 95 and 96, to progressively truncate the peaks 83 toward the two ends of the insert, so that the peaks gradually tap their way into part 77 upon installation of the insert. To optimize this initial tapping action, to assure proper centering of the insert during the initial installing step, and to prevent spreading of the axially outer end of the insert by an installing tool, the angle of chamfer $a$ should be relatively small, preferably not greater than about 30 degrees, and for best results approximately 20 degrees.

FIG. 19 illustrates fragmentarily another form of the invention, which may be considered identical with that of FIGS. 16 through 18 except for the provision within recesses 84 of minimum diameter surface areas 97 which are curved cylindrically about main axis 98 of the insert. As in FIG. 7, the distance between the points of tangency 100 (corresponding to points 90 in FIG. 17) is preferably at least about as great across recessed areas 97 as across the peaks 99.

In all forms of the invention, it is preferred that the inter-peak recesses (such as at 91 in FIGS. 16 through 18) be sufficiently shallow that the external threads, though truncated, will continue through the major portion (desirably all) of the circular distance between two maximum diameter peak locations 86; and also through a substantial portion, and desirably substantially all, of the circular distance between two of the closest points 100 at which one of the tangency planes touches two adjacent peaks.

All of the various peak and recess configurations shown in the different forms of the invention are of course preferably given to the ultimate insert by predetermination of the initial external configuration of the bar stock utilized in forming the insert. Also, without discussing the operation of the different variational forms illustrated in FIGS. 7 through 19, it will be apparent that the basic manner of operation, the manner in which threads are tapped into the carrier part, and in which the peaks act to lock the insert against unscrewing movement and against axial withdrawal from the carrier part, are all generally the same as in the first form of the invention. Further, the limiting relationship between recess depth K and wall thickness W, as discussed in connection with the first form of the invention, preferably holds true for the other forms of the invention also.

I claim:

1. An element comprising a body having external threads about an axis to be screwed into a carrier member; said threads having modified minor diameter surfaces which are substantially wider axially than the narrowest portions of the crests of said threads; said body having a second set of threads different from said external threads for engaging a mating part to attach it to said carrier member; said external threads having radially outer surfaces of non-circular cross-section defining radially outwardly projecting circularly spaced peaks, and which, in advancing circularly between peaks, advance first progressively radially inwardly and then outwardly relative to said axis and said modified minor diameter surfaces, and thereby progressively truncate the external threads to first progressively decrease and then increase in radial thickness; said outer surfaces having minimum radius portions circularly between said peaks at which said surfaces are nearest to said axis and which are recessed radially inwardly a substantial distance beyond planes drawn to just touch adjacent peaks; said body having at least one end which may be its leading end upon installation and which has a tapering chamfer surface of circular cross section centered about said axis and progressively truncating said peaked threads toward said end of the body; said external threads having opposite side faces defining a thread profile which remains the same from one minimum radius portion to the next except insofar as the threads are truncated; said outer surfaces, as they advance radially inwardly, increasing in width axially between said opposite side faces; said outer surfaces, as they commence their inward advancement from the outermost portions of said peaks, at sides of the peaks which may be the circularly leading sides when said element is screwed into said carrier member, being shaped to initially advance primarily in a circularly advancing direction and at a much slower rate radially inwardly; and said outer surfaces changing progressively in radial distance from said axis through the major portion of the circular distance between two successive minimum radius portions.

2. An element as recited in claim 1, in which said chamfer surface tapers at an angle of not greater than about 30 degrees.

3. An element as recited in claim 1, in which said opposite side faces are disposed at an included angle less than about 50 degrees.

4. An element as recited in claim 1, in which said outer surfaces are recessed shallowly enough that said first threads, though truncated, nevertheless continue through substantially the entire circular distance between the closest points at which one of said planes touches two successive peaks.

5. An element comprising a body having external threads about an axis to be screwed into a carrier member; said threads having modified minor diameter surfaces which are substantially wider axially than the narrowest portions of the crests of said threads; said body having a second set of threads different from said external threads for engaging a mating part to attach it to said carrier member; said external threads having radially outer surfaces of non-circular cross-section defining radially outwardly projecting circularly spaced peaks, and which, in advancing circularly between peaks, advance first progressively radially inwardly and then outwardly relative to said axis and said modified minor diameter surfaces, and thereby progressively truncate the external threads to first progressively decrease and then increase in radial thickness; said outer surfaces having minimum radius portions circularly between said peaks at which said surfaces are nearest to said axis and which are recessed radially inwardly a substantial distance beyond planes drawn to just touch adjacent peaks; said body having at least one end which may be its leading end upon installation and which has a tapering chamfer surface of circular cross section centered about said axis and progressively truncating said peaked threads toward said end of the body; said external threads having opposite side faces defining a thread profile which remains the same from one minimum radius portion to the next except insofar as the threads are truncated; said outer surfaces, as they advance radially inwardly, increasing in width axially between said opposite side faces; said outer surfaces, as they commence their inward advancement from the outermost portions of said peaks, at sides of the peaks which may be the circularly leading sides when said element is screwed into said carrier member, being shaped to initially advance primarily in a circularly advancing direction and at a much slower rate radially inwardly; said rate of radially inward advancement becoming progressively more rapid as the surfaces continue inwardly so that said outer surfaces have convex curvature as they change in radial distance from said axis at the leading sides of said peaks; and said outer surfaces changing progressively in radial distance from said axis through the major portion of the circular distance between two successive minimum radius portions.

6. An element comprising a body having external threads about an axis to be screwed into a carrier member; said threads having modified minor diameter surfaces which are substantially wider axially than the narrowest portions of the crests of said threads; said body having a second set of threads different from said external threads for engaging a mating part to attach it to said carrier member; said external threads having radially outer surfaces of non-circular cross-section defining radially outwardly projecting circularly spaced peaks, and which, in advancing circularly between peaks, advance first progressively radially inwardly and then outwardly relative to said axis and said modified minor diameter surfaces, and thereby progressively truncate the external threads to first progressively decrease and then increase in radial thickness; said outer surfaces having minimum radius portions circularly between said peaks at which said surfaces are nearest to said axis and which are recessed radially inwardly a substantial distance beyond planes drawn to just touch adjacent peaks; said body having at least one end which may be its leading end upon installation and which has a tapering chamfer surface of circular cross section centered about said axis and progressively truncating said peaked threads toward said end of the body; said external threads having opposite side faces defining a thread profile which remains the same from one minimum radius portion to the next except insofar as the threads are truncated; said outer surfaces, as they advance radially inwardly, increasing in width axially between said opposite side faces; said outer surfaces, as they commence their inward advancement from the outermost portions of said peaks, at sides of the peaks which may be the circularly leading sides when said element is screwed into said carrier member, being shaped to initially advance primarily in a circularly advancing direction and at a much slower rate radially inwardly; said outer surfaces, in advancing circularly toward and past said peaks, being shaped to first advance radially outwardly at a rate which becomes progressively more gradual, in approaching the extreme outermost portion of a peak, and to then advance radially inwardly, beyond said outermost portion, at a rate which becomes progressively more rapid, so that said outer surfaces have convex curvature as they change in radial distance from said axis at both the leading and trailing sides of the peak; and said outer surfaces changing progressively in radial distance from said axis through the major portion of the circular distance between two successive minimum radius portions.

7. An element comprising a body having external threads about an axis to be screwed into a carrier member; said threads having modified minor diameter surfaces which extend substantially axially through a distance at least about as great as the maximum radial thickness of said threads at said peaks; said body having a second set of threads which are internal and within and concentric with said external threads for engaging a mating part to attach it to said carrier member; said external threads having radially outer surfaces of non-circular cross-section defining radially outwardly projecting circularly spaced peaks, and which, in advancing circularly between peaks, advance first progressively radially inwardly and then outwardly relative to said axis and said modified minor diameter surfaces, and thereby progressively truncate the external threads to first progressively decrease and then increase in radial thickness; said outer surfaces having minimum radius portions circularly between said peaks at which said surfaces are nearest to said axis and which are recessed radially inwardly a substantial distance beyond planes drawn to just touch adjacent peaks and to a diameter near that of said modified minor diameter surfaces; said body having at least one end which may be its leading end upon installation and which has a chamfer surface of circular cross section tapering at an angle of not greater than about 30 degrees, centered about said axis and progressively truncating said peaked threads toward said end of the body; said external threads having opposite side faces disposed at an included angle of less than about 50 degrees and defining a thread profile which remains the same from one minimum radius portion to the next except insofar as the threads are truncated; said outer surfaces as they advance radially inwardly, increasing in width axially between said opposite side faces; said outer surfaces, as they commence their inward advancement from the outermost portions of said peaks, at both sides of the peaks, being shaped to initially advance primarily in a circular direction and at a much slower rate radially inwardly; said outer surfaces changing in radial distance from said axis substantially continuously and gradually, first in an increasing direction and then in a decreasing direction, from one of said minimum radius portions, across a peak, to the next minimum radius portion; and said outer surfaces curving smoothly and with outwardly convex curvature and substantially continuously as they first increase in radius from a location near one of said minimum radius portions, then extend across a peak, and then decrease in radius to a location near the next minimum radius portion.

8. An element comprising a body having external threads about an axis to be screwed into a carrier member; said threads having modified minor diameter surfaces which are substantially wider axially than the narrowest portions of the crests of said threads; said external threads having radially outer surfaces of non-circular cross-section defining radially outwardly projecting circularly spaced peaks, and which, in advancing circularly between peaks, advance first progressively radially inwardly and then outwardly relative to said axis and said modified minor diameter surfaces, and thereby progressively truncate the external threads to first progressively decrease and then increase in radial thickness; said outer surfaces having minimum radius portions circularly between said peaks at which said surfaces are nearest to said axis and which are recessed radially inwardly a substantial distance beyond planes drawn to just touch adjacent peaks; said body having at least one end which may be its leading end upon installation and which has a tapering chamfer surface of circular cross section centered about said axis and progressively truncating said peaked threads toward said end of the body; said external threads having opposite side faces defining a thread profile which remains the same from one minimum radius portion to the next except insofar as the threads are truncated; said outer surfaces, as they advance radially inwardly, increasing in width axially between said opposite side faces; said outer surfaces, as they commence their inward advancement from the outermost portions of said peaks, at sides of the peaks which may be the circularly leading sides when said element is screwed into said carrier member, being shaped to initially advance primarily in a circularly advancing direction and at a much slower rate radially inwardly; and said outer surfaces changing progressively in radial distance from said axis through the major portion of the circular distance between two successive minimum radius portions.

(References on following page)

References Cited by the Examiner

UNITED STATES PATENTS

| | | | |
|---|---|---|---|
| 700,892 | 5/02 | Blackburn | 10—141 |
| 2,352,982 | 7/44 | Tomalis | 85—47 |
| 2,873,641 | 2/59 | Evans | 85—47 |
| 2,984,279 | 5/61 | Rosan | 85—45 |
| 3,134,290 | 5/64 | Jentoft | 85—47 |

FOREIGN PATENTS

| | | |
|---|---|---|
| 210,236 | 7/60 | Austria. |
| 1,045,972 | 7/53 | France. |
| 667,051 | 2/52 | Great Britain. |
| 843,129 | 8/60 | Great Britain. |

EDWARD C. ALLEN, *Primary Examiner.*